Patented Oct. 17, 1933

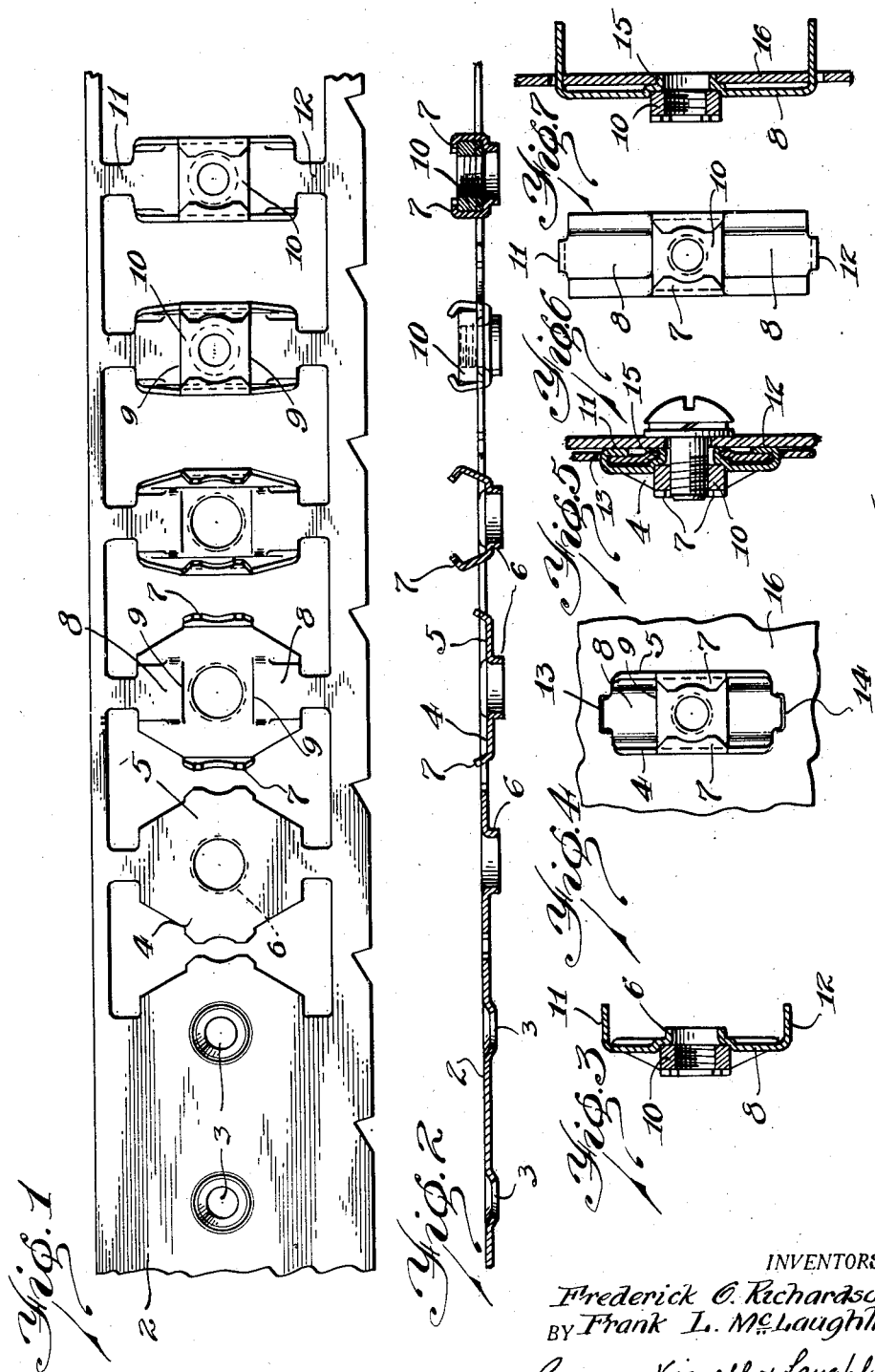

1,931,011

UNITED STATES PATENT OFFICE 1,931,011

CLINCH-ON NUT

Frederick G. Richardson and Frank L. McLaughlin, Detroit, Mich., assignors to F. L. McLaughlin Company, Detroit, Mich., a corporation of Michigan Application November 1, 1932. Serial No. 640,671

6 Claims. (Cl. 85—32)

This invention relates to a clinch-on nut, and more particularly to the improved form of wheel housing fender nut.

The present invention constitutes an improvement over the clinch-on type of nut disclosed in Patents Nos. 1,753,791 of April 8, 1930 and 1,761,358 of June 3, 1930. The main feature of such improvements consists in the manner of fabricating the casing so as to make the nut particularly applicable to relatively large surfaces requiring good reinforcement such as to the rear fender wheel housing of an automobile body. More specifically, the present invention contemplates the fabrication of a relatively long and narrow casing having two side walls bent to receive and retain a standard nut, embossed portions to reinforce the casing and assist in positioning the nut, and three projecting members for insertion and assembly in fixed relation to a sheet metal part preparatory to receiving the fastening or securing bolt.

Other novel features of detailed design and construction will be more clearly set forth in the specification and claims.

In the drawing:

Fig. 1 is a plan view illustrating the successive steps for forming the novel fender lug from a strip of sheet metal.

Fig. 2 is a longitudinal sectional view of the structure shown in Fig. 1.

Fig. 3 is a sectional view of the finished fabricated fender lug.

Fig. 4 is a plan view showing the complete unit permanently assembled on a sheet metal surface preparatory to receiving the fastening member.

Fig. 5 is a sectional view taken through a complete assembly unit and showing the fastening or securing bolt in position.

Fig. 6 is a plan view of a modified form of retaining nut unit.

Fig. 7 is a longitudinal sectional view of the structure shown in Fig. 1.

One of the main uses for the improved nut unit is for connecting the rear fender to the rear wheel housing of the automobile body, and such a unit has been illustrated in the drawing. This unit is broadly known as a "fender lug" and will be referred to as such throughout the specification.

In fabricating this fender lug a strip of sheet metal 2 may be subjected to successive stamping and forming operations which include the forming of the aperture 3, the blanking out of the side walls 4 and 5 and the exclusion of the walls of the aperture as at 6. The extreme edges 7 of the side walls may then be slightly turned up and the central portion embossed as at 8 to reinforce the unit and to form shoulders 9 for locating a standard nut.

A standard nut 10 may then be inserted in position and the side walls turned over to permanently clamp the nut in position, which is shown as the last step in Figs. 1 and 2. The tongues 11 and 12 left at each end of the unit may then be sheared off to form fastening means for securing the fender lug in position.

Suitable slots 13 and 14 are punched in the sheet of metal for receiving the permanent fender lug and an aperture 15 of suitable size to receive the extruded portion 6 is punched midway between the slots 13 and 14. The fender lug is assembled in position by inserting the apertured portion 6 and the prongs 11 and 12 in the corresponding punched out portions in the sheet metal, and these are then turned or flanged over as shown in Fig. 5. The turned over prongs 11 and 12 permanently hold the nut member in position and prevent the same from turning. The extruded portion 6 may be flanged over as shown in Fig. 5 and materially reinforces the center of the entire assembly, and the flanging over of this portion together with the turning over of the prongs 11 and 12 materially reduces the drumming sound in the rear fender wheel housing, or wherever else it might be used. In other words, a plurality of these fender lugs secured in an arc around the rear fender wheel housing will materially strengthen the sheet metal over what could be accomplished by using a plurality of smaller clinch-on nuts and will make for a much more quick, easy and permanent assembly.

The entire fender lug cage and, of course, the standard nut 10 can be fabricated for substantially the same cost as the clinch-on nut unit disclosed in Patent No. 1,761,358, but the three point reinforcement will obviously make for a much stronger assembly to reduce the drumming noise where such is objectionable and will eliminate the use of a D-shape or other irregular shape in the sheet metal surface or article to which the lug is permanently secured.

In the modified form of fender lug or clinch-on nut shown in Figs. 6 and 7, the design is substantially the same as the preferred form of lug except that the reinforcing side wall portions 4 and 5 have been eliminated. In other words, the only strengthening the lug obtains between the nut portion and the prongs 11 and 12 is the embossed reinforcing portions 8.

The embossed portion 8 extending longitudinally to each side of the aperture 6 not only reinforces the casing but also permits the portion of the sheet of metal 16 which is directly above said embossed portions to be pressed down into the embossed portions in the event enough pressure is applied in the assembly of the unit.

What we claim is:

1. Fastening structure of the type wherein a nut is attached to a sheet of metal for the reception of a bolt, comprising a nut unit including a standard nut member at least partially enclosed by a sheet metal casing, said sheet of metal being provided with an aperture and said sheet metal casing being provided with a centrally positioned extension protruding through said aperture, said casing being fabricated to provide inwardly projecting prongs longitudinally positioned from said extension, and apertures in said sheet of metal registering with and receiving said prongs, said casing being so shaped and said extension and prongs being turned over to permanently clinch the sheet of metal on two surfaces of said sheet metal casing whereby said nut unit is permanently attached to the sheet of metal independently of the nut member.

2. Fastening structure of the type wherein a nut is attached to a sheet of metal for the reception of a bolt, comprising a nut unit including a standard nut member at least partially enclosed by a sheet metal casing, said sheet of metal being provided with a circular aperture and said sheet metal casing being provided with a circular extension protruding through said apture, said casing being fabricated to provide inwardly projecting prongs longitudinally positioned from said extension, and apertures in said sheet of metal registering with and receiving said prongs, said casing being so shaped and said extension and prongs being turned over to permanently clinch the sheet of metal on two surfaces of said sheet metal casing whereby said nut unit is permanently attached to the sheet of metal independently of the nut member.

3. As a new article of manufacture, a nut unit of the type adapted to be permanently inclinched in a plurality of apertures in a sheet metal article, comprising a substantially square standard nut for receiving a bolt, an exterior member having fixed walls enclosing a portion of the top, bottom and side walls of the nut, said exterior member having an annular portion cooperating with an aperture in said sheet metal article and another portion non-rotatably cooperating with an aperture in said sheet metal article, said annular and non-rotatable portions being permanently distorted to serve as the sole means for clinching the nut element in position.

4. Fastening and reinforcing structure of the type wherein a nut is attached to a sheet of metal for the reception of a bolt, comprising a nut unit including a standard nut member in a relatively long and narrow sheet metal casing, embossing a portion of top, bottom and side walls of the nut, an aperture in said sheet of metal for registering with the threaded aperture of the nut, and an extension formed as a part of said casing and protruding through said aperture, an inturned prong formed at the end of said casing and longitudinally spaced from said extension, said prong protruding through an aperture in said sheet of metal, and said extension and prong being permanently distorted to reinforce the sheet of metal and to permanently position said nut member.

5. Fastening and reinforcing structure of the type wherein a nut is attached to a sheet of metal for the reception of a bolt, comprising a nut unit including a standard nut member in a relatively long and narrow sheet metal casing, embossing a portion of top, bottom and side walls of the nut, an aperture in said sheet of metal for registering with the threaded aperture of the nut, and an extension formed as a part of said casing and protruding through said aperture, inturned prongs formed at each end of said casing and longitudinally spaced from said extension, said prongs protruding through an aperture in said sheet of metal, and said extension and prongs being permanently distorted to reinforce the sheet of metal and to permanently position said nut member.

6. Fastening and reinforcing structure of the type wherein a nut is attached to a sheet of metal for the reception of a bolt, comprising a nut unit including a standard nut member in a relatively long and narrow sheet metal casing, embossing a portion of top, bottom and side walls of the nut, an aperture in said sheet of metal for registering with the threaded aperture of the nut, and an extension formed as a part of said casing and protruding through said aperture, an inturned prong formed at the end of said casing and longitudinally spaced from said extension, said prong protruding through an aperture in said sheet of metal, and said prong being turned over to reinforce the sheet of metal and to permanently position said nut member.

FREDERICK G. RICHARDSON.
FRANK L. McLAUGHLIN.